Oct. 16, 1923.  
W. P. DRYER  
VALVE GEAR  
Filed June 14, 1921  
1,471,316  
2 Sheets-Sheet 1

Inventor:
William P. Dryer,
by *Albert G. Davis*
His Attorney.

Oct. 16, 1923.

W. P. DRYER

VALVE GEAR

Filed June 14, 1921    2 Sheets-Sheet 2

1,471,316

Inventor:
William P. Dryer,
by *Alvin G. Davis*
His Attorney.

Patented Oct. 16, 1923.

1,471,316

UNITED STATES PATENT OFFICE.

WILLIAM P. DRYER, OF SCHENECTADY, NEW YORK, ASSIGNOR TO GENERAL ELECTRIC COMPANY, A CORPORATION OF NEW YORK.

VALVE GEAR.

Application filed June 14, 1921. Serial No. 477,543.

*To all whom it may concern:*

Be it known that I, WILLIAM P. DRYER, a subject of the British Empire, residing at Schenectady, in the county of Schenectady, State of New York, have invented certain new and useful Improvements in Valve Gears, of which the following is a specification.

The present invention relates to valve gears such as are utilized for controlling the admission of elastic fluid to prime movers and is particularly intended for use in connection with elastic fluid turbines although its use is not limited thereto.

The object of my invention is to provide an improved structure and arrangement in an apparatus of this character, and for a consideration of what I believe to be novel and my invention, attention is directed to the accompanying description and the claims appended thereto.

Figure 1:
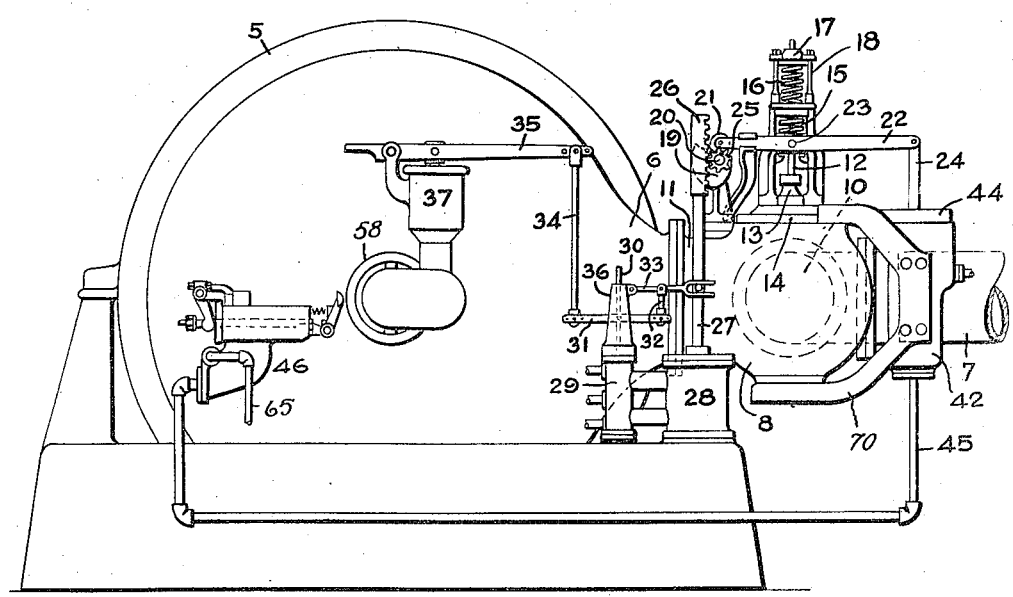
Figure 2:
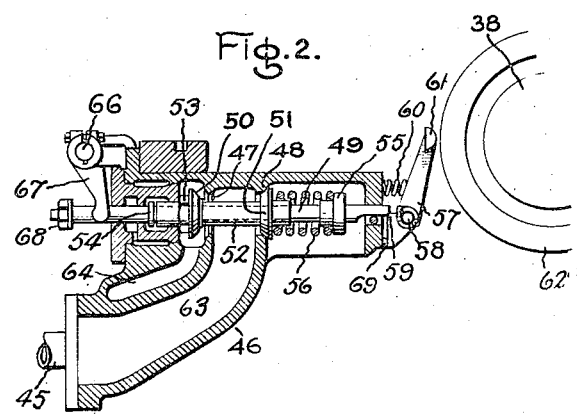
Figure 3:
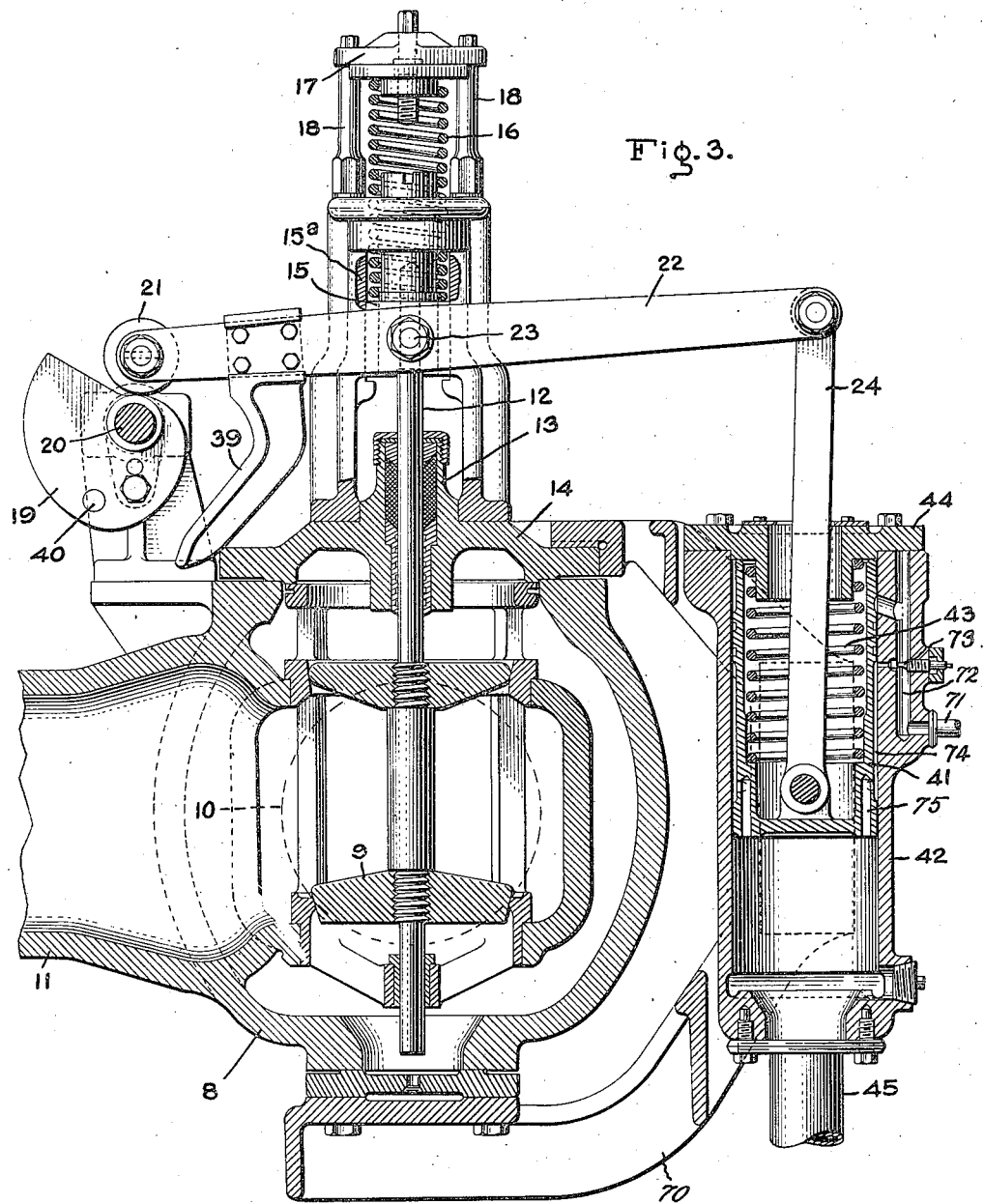

In the drawing, Fig. 1 is a view of a more or less diagrammatic nature showing an elastic fluid turbine with my improved valve gear applied thereto; Fig. 2 is a sectional view through an emergency trip valve, and Fig. 3 is a sectional view through a controlling valve.

Referring to the drawing, 5 indicates an elastic fluid turbine of suitable design having an inlet opening 6 for the admission of elastic fluid, and an exhaust conduit (not shown) which in general is connected to a condenser as is well understood. Connected to inlet opening 6 is a supply conduit 7 in which is located a valve casing 8 containing a valve 9 for controlling the flow of elastic fluid to the turbine. The inlet opening to the valve casing is indicated at 10 and the discharge opening is indicated at 11. Valve 9 has a stem 12 which extends through a suitable stuffing box 13 in valve casing cap 14 and at its upper end is connected to a block 15 adapted to slide vertically in ways 15ª. The valve is biased to closed position by a spring 16 which at its lower end seats on block 15 and at its upper end engages a cross piece 17 carried by standards 18. Valve 9 is opened against the action of spring 16 by a cam 19 carried by a shaft 20 and adapted to engage a roller 21 at one end of a lever 22. Lever 22 is pivotally connected to block 15 as indicated at 23. The other end of lever 22 is pivotally connected to the upper end of a rod 24 which normally forms a fixed fulcrum for the lever.

On cam shaft 20 is fixed a pinion 25 with which meshes a rack 26 on the upper end of a piston rod 27. Piston rod 27 is carried by the piston of a fluid motor the cylinder of which is indicated at 28 and the pilot valve at 29. The pilot valve stem 30 is pivotally connected to a floating lever 31 which at one end is connected by a link 32 to a differential lever 33 and at the other end by a link 34 to a governor lever 35. Differential lever 33 is pivoted at one end to ears on the pilot valve stem guide 36 and at the other end is loosely connected to rod 27. Governor lever 35 is connected to the stem of a speed governor 37 driven from the turbine shaft which is indicated at 38 in Fig. 2.

The foregoing may be taken as typical of any suitable control valve arranged to be actuated by a speed governor and is shown only by way of example. The operation of a control valve by a governor through the medium of a fluid motor is well understood and needs no description. The drawing shows an ordinary arrangement wherein the connections include a follow up device to prevent over-travel. The valve is biased to closed position by the spring 16 and is adapted to be closed by it. In case it should stick open means are provided for positively closing it comprising a hook 39 on lever 22 adapted to be engaged by a pin 40 projecting from cam 19. When cam 19 turns to open the valve, pin 40 stands above hook 39 so that if the valve does not move toward closed position when released by cam 19, the pin engages the hook and positively moves the valve.

The valve and governor arrangement described forms the regulating means for controlling the speed of the turbine when in operation as is well understood.

According to my invention I provide an arrangement whereby the regulating valve as described above is automatically closed independently of the speed governor in case of certain abnormal operating conditions. To this end, according to one form of my invention, I support rod 24 by means of a movable abutment held stationary by fluid pressure. As long as the fluid pressure is maintained rod 24 presents a fixed fulcrum for the operating lever 22. When such fluid pressure fails, however, the fulcrum is released thereby permitting the valve to close. Preferably the fluid pressure for maintaining the fulcrum stationary is supplied from the lubricating system for the turbine and an arrangement is provided whereby in case of excess speed the supply of fluid to the support formed by the movable abutment is cut off and the fluid chamber of the movable abutment is connected to a region of lower pressure. With this arrangement the valve will be automatically closed in case of either excess speed or the failure of lubricant supplied.

Referring specifically to the drawing, rod 24 is connected at its lower end to a piston 41 which moves in a cylinder 42. In cylinder 42 is a spring 43 which surrounds the lower end of rod 24 and at one end engages the head of piston 41 and at the other end engages cap 44 on cylinder 42. Spring 43 acts in a direction to force piston 41 downward in cylinder 42 and the valve 9 toward closed position. Connected to cylinder 42 below piston 41 is a pipe 45 which leads to a valve casing 46 provided with opposed seats 47 and 48. In valve casing 46 is a valve stem 49 which carries valves 50 and 51. Valve 50 cooperates with seat 47 and valve 51 cooperates with seat 48 and the arrangement is such that when one valve is closed the other is open. In order to insure the seating of valves 50 and 51, and particularly the latter, they are yieldingly connected to stem 49 in a manner to permit them to move axially slightly on the stem. To this end the valves are carried by a sleeve 52 which surrounds stem 49 and can slide axially thereon. Valve 51 is shown as being formed integral with sleeve 52 and valve 50 is shown as being fastened thereon by a nut 53. Sleeve 52 is located between collars 54 and 55 on valve stem 49 and between collar 55 and sleeve 52 is located a spring 56 one end of which bears against collar 55 and the other end against the back of valve 51. Stem 49 is adapted to be held in a position wherein valve 51 is closed and valve 50 is opened by a trip lever 57 pivoted at 58 and having a catch 59 adapted to stand over and engage with the end of stem 49. Lever 57 is biased to this position by a spring 60. Normal position of the parts is shown in Fig. 2 and it will be seen that when stem 49 is moved into engagement with catch 59, spring 56 will take care of any inaccuracies in the parts and insure the seating of valve 51.

The outer end of lever 57 is provided with a head 61 which stands in proximity to an emergency trip governor device 62. The emergency trip governor device may be of any suitable type and is shown diagrammatically only. In the present instance it is indicated as comprising an eccentric ring carried by shaft 38 and held from movement transversely of the shaft by a suitable spring or other means (not shown). In case of excess speed the ring is thrown outwardly by centrifugal force to strike head 61 thereby turning trip lever 57 and moving catch 59 away from and out of engagement with the end of stem 49. This type of emergency governor is well known and is accordingly not shown in detail. Valve 60 when open connects a chamber 63 in the valve casing to a chamber 64 to which is connected a supply pipe 65 which leads from a suitable source of fluid pressure supply preferably the lubricating system of the turbine. When valve 50 is closed and valve 51 is open supply pipe 65 is disconnected from chamber 63 and such chamber is then connected by valve 51 to a region of lower pressure. Pivoted on valve casing 46 is a shaft 66 which carries a resetting lever 67 adapted to engage a collar 68 on the end of stem 49, such collar in the present instance being shown in the form of a nut. On shaft 66 is a hand lever (not shown) for turning the shaft, to reset the trip valve. The movement of lever 57 toward trip ring 62 is limited by a stop 69 against which the lower end of the lever is held by spring 60.

Cylinder 42 may be supported adjacent valve casing 8 in any suitable manner, it being shown in the present instance as being supported by a bracket 70. At 71 is a discharge pipe which connects to cylinder 42 below piston 41 by way of passage 72, needle valve 73, annular space 74 and holes 75. The purpose of this is to permit a small amount of circulation of liquid through the cylinder for cooling purposes.

The operation is as follows: When the turbine is running the parts are in positions shown in the drawing except that valve 9 will have been opened sufficiently to admit the amount of elastic fluid required to carry the load on the turbine, such opening being effected by cam 19 lifting lever 22. As the load varies, valve 9 will be regulated by speed governor 37 through the intermediary of the servo-motor to maintain the speed substantially constant. The end of lever 22 which is connected to rod 24 will be held fixed by fluid pressure under piston 41 which fluid pressure is preferably taken from the lubricating system for the turbine and is supplied by way of pipe 65 to chamber 64 thence through valve 50 which is open to chamber 63 and then by pipe 45 to cylinder 42. Now, in case of excess speed, the emergency governor member 62 will fly out by centrifugal force and strike head 61 on lever 57, thereby turning the lever and moving catch 59 away from the end of valve stem 49. The pressure in chamber 63 then acts to force valve stem 49 toward the right in Fig. 2 thus opening valve 51 and closing valve 50. In actual practice, I have found the pressure in chamber 63 sufficient for actuating the valves but if found desirable I may of course utilize same means such as a spring to assist the movement. The closing of valve 50 shuts off the supply of fluid pressure to cylinder 42 and the opening of valve 51 connects cylinder 42 to a region of lower pressure. The pressure in cylinder 42 is thus quickly releived whereupon spring 43 will force piston 41 downward to close valve 9 and shut down the turbine. The closing movement of the valve will be assisted by spring 16 which normally biases the valve toward closed position. It will thus be seen that in case of excess speed valve 9 is closed quite independently of the usual regulating means for the valve comprising speed governor 37 and the servo motor. Valve 9 will be closed automatically also in the manner just described in case the supply of lubricating oil fails, for upon such failure the pressure under piston 41 will be relieved.

As soon as the turbine speed returns to normal or below the mechanism is reset by turning shaft 66 whereupon resetting lever 67 will move valve stem 49 to the left (Fig. 2) opening valve 50 and closing valve 51. When the end of stem 49 moves beyond the catch 59, spring 60 will turn trip lever 57 to bring catch 59 over the end of the stem thus fastening the parts again in set position.

The foregoing arrangement may be used in connection with the usual emergency valve mechanism with which machines of this character are generally provided and thereby provides a double factor of safety for in case of an abnormal operating condition, such as the load going off, both the emergency valve mechanism and the regulating valve mechanism will be closed.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a prime mover, of a valve mechanism controlling the admission of motive fluid thereto, a lever connected to the valve mechanism, a speed governor connected to the lever for regulating the opening of said valve mechanism in accordance with the load on the prime mover, a servo-motor through which the governor operates the lever, a releasable fulcrum for said lever, an emergency governor, and means actuated by the emergency governor for automatically releasing said fulcrum to effect the closing of the valve mechanism independently of the servo-motor.

2. The combination with a prime mover, of a valve mechanism controlling the admission of motive fluid thereto, a lever connected to the valve mechanism, a speed governor connected to the lever for regulating the opening of said mechanism in accordance with the load on the prime mover, a servo-motor through which the governor operates the valve mechanism, a fluid-supported abutment which forms a fulcrum for said lever, means for supplying fluid pressure to said abutment, an emergency governor, and means actuated by the emergency governor for relieving the fluid pressure supplied to the abutment to effect the closing of the valve mechanism independently of the servo-motor.

3. The combination with a prime mover, of a valve mechanism controlling the admission of motive fluid thereto, a lever connected directly to the valve mechanism, a movable abutment which presents a stationary fulcrum for the lever, governor mechanism including a fluid-actuated motor for moving the lever about such fulcrum to open and close the valve mechanism, means for supplying fluid pressure to the abutment, and means for relieving the fluid pressure supplied to the abutment to permit the valve mechanism to close independently of said governor mechanism and fluid-actuated motor.

4. The combination with a prime mover, of a valve mechanism controlling the admission of motive fluid thereto, a lever connected directly to said valve mechanism, a movable abutment which presents a stationary fulcrum for the lever, governor mechanism including a fluid-actuated motor for moving the lever about such fulcrum to open and close the valve mechanism, a conduit for supplying fluid pressure to the abutment, a valve in the conduit for cutting off the supply of fluid pressure to the abutment, and means responsive to an abnormal operating condition of the prime mover for actuating said valve to effect the closing of said valve mechanism independently of said governor mechanism and fluid-actuated motor.

5. The combination with a prime mover, of a valve mechanism controlling the admission of motive fluid thereto, a lever connected directly to said valve mechanism, a movable abutment which presents a stationary fulcrum for the lever, governor mechanism including a fluid-actuated motor for moving the lever about such fulcrum to open and close the valve mechanism, a conduit connected to the abutment, a valve structure for connecting said conduit to a supply of fluid pressure or to a region of lower pressure, and an emergency governor mechanism for actuating said valve structure to effect the closing of said valve mechanism independently of said governor mechanism and fluid-actuated motor.

6. The combination with a prime mover, of a valve controlling the admission of motive fluid thereto, a stem on the valve, a lever to the central portion of which said stem is connected, a cylinder, a piston in the cylinder, connected to one end of said lever, means for supplying fluid pressure to said cylinder to hold the piston stationary so it presents a fixed fulcrum for the lever, a governor for moving the other end of the lever, and means for relieving the pressure in said cylinder to permit the valve to close independently of said governor.

In witness whereof, I have hereunto set my hand this 11th day of June, 1921.

WILLIAM P. DRYER.